US010906261B2

(12) United States Patent
De Bruijn et al.

(10) Patent No.: US 10,906,261 B2
(45) Date of Patent: Feb. 2, 2021

(54) EXTRUDER HEAD FOR EXTRUDING CORD-REINFORCED EXTRUDATE (71) Applicant: VMI Holland B.V., Epe (NL)

(72) Inventors: Ronald Gerardus Maria De Bruijn, Epe (NL); Emiel Hendricus De Jong, Epe (NL); Gerardus Johannes Catharina Van Laar, Epe (NL)

(73) Assignee: VMI HOLLAND B.V.

( * ) Notice: Subject to any disclaimer, the term of this patent is extended or adjusted under 35 U.S.C. 154(b) by 177 days.

(21) Appl. No.: 16/304,024

(22) PCT Filed: May 12, 2017

(86) PCT No.: PCT/NL2017/050294
§ 371 (c)(1),
(2) Date: Nov. 21, 2018

(87) PCT Pub. No.: WO2017/204624

PCT Pub. Date: Nov. 30, 2017

(65) Prior Publication Data

US 2020/0282621 A1    Sep. 10, 2020

(30) Foreign Application Priority Data

May 25, 2016  (NL) ....................................  2016826

(51) Int. Cl.
*B29D 30/38*  (2006.01)
*B29C 48/07*  (2019.01)
(Continued)

(52) U.S. Cl.
CPC .............. *B29D 30/38* (2013.01); *B29C 48/07* (2019.02); *B29C 48/154* (2019.02);
(Continued)

(58) Field of Classification Search
CPC .... B29C 48/2886; B29C 48/49; B29C 48/307
See application file for complete search history.

(56) References Cited

U.S. PATENT DOCUMENTS 5,292,472 A    3/1994  Tompkins ............... B29C 47/02
8,162,644 B2   4/2012  Kudo et al. ................. 425/72.1
(Continued)

FOREIGN PATENT DOCUMENTS

EP    0339510    4/1989    ............. B29C 47/28
JP    S5436374   3/1979    ............. B29B 7/00
(Continued)

OTHER PUBLICATIONS

International Preliminary Report on Patentability issued in application No. PCT/NL2017/050294, dated Nov. 27, 2018 (7 pgs).
(Continued)

*Primary Examiner* — Jacob T Minskey
*Assistant Examiner* — Adrien J Bernard
(74) *Attorney, Agent, or Firm* — Hayes Soloway P.C.

(57) ABSTRACT

The disclosure relates to an extruder head for extruding cord reinforced extrudate, wherein the extruder head includes a die and a cord guide, wherein the extruder head further includes a first flow channel that extends along a first flow path through the extruder head at and debouches into the die from a first side of a cord plane and a second flow channel that extends along a second flow path through the extruder head at and debouches into the die from a second side of the cord plane, wherein the first flow path and the second flow path each include a supply section and a coat-hanger section, wherein the first flow path and the second flow path, in their respective coat-hanger sections, extend within a first range of eighty-five to ninety-five degrees with respect to the cord plane along at least seventy percent of the coat-hanger sections.

32 Claims, 8 Drawing Sheets (51) Int. Cl.
  *B29C 48/154* (2019.01)
  *B29C 48/156* (2019.01)
  *B29C 48/25* (2019.01)
  *B29C 48/285* (2019.01)
  *B29C 48/305* (2019.01)
  *B29C 48/49* (2019.01)

(52) U.S. Cl.
  CPC ........ *B29C 48/156* (2019.02); *B29C 48/2566* (2019.02); *B29C 48/2883* (2019.02); *B29C 48/305* (2019.02); *B29C 48/307* (2019.02); *B29C 48/2562* (2019.02); *B29C 48/49* (2019.02)

(56) References Cited

U.S. PATENT DOCUMENTS

| | | | | |
|---|---|---|---|---|
| 8,585,389 | B2 | 11/2013 | Grashuis et al. | 425/113 |
| 9,579,839 | B2 | 2/2017 | Kenny et al. | B29C 47/027 |
| 2015/0283750 | A1 | 10/2015 | Kenny et al. | B29C 4/025 |
| 2016/0059466 | A1* | 3/2016 | Dyrlund | B29C 48/2883 |
| | | | | 425/466 |
| 2016/0176096 | A1* | 6/2016 | Dyrlund | B29C 48/304 |
| | | | | 425/192 R |
| 2018/0043599 | A1 | 2/2018 | Uphus et al. | B29C 47/027 |

FOREIGN PATENT DOCUMENTS

| | | | |
|---|---|---|---|
| JP | S5636422 | 4/1981 | ............... B29B 7/00 |
| JP | 7-1541 | 1/1995 | ............. B29C 47/02 |
| JP | 7-146428 | 6/1995 | ............. G02B 6/44 |
| JP | 2004025597 | 1/2004 | ............. B29C 47/02 |
| JP | 2006-110830 | 4/2006 | ............. B29C 47/12 |
| JP | 2009-269188 | 11/2009 | ............. B29C 47/02 |
| JP | 2015-212091 | 11/2015 | ............. B29C 47/02 |
| KR | 920004617 | 3/1992 | ............... D01D 4/02 |
| KR | 20090129993 | 12/2009 | ............. B29C 47/50 |
| WO | WO2007083346 | 7/2007 | ............. B29C 47/02 |
| WO | WO2015105413 | 7/2015 | ............. B29D 30/38 |

OTHER PUBLICATIONS

International Search Report and Written Opinion issued in application No. PCT/NL2017/050294, dated Sep. 6, 2017 (11 pgs).

Korean Decision to Grant issued in application 10-2017-7031616 (w/machine translation), dated Nov. 25, 2019 (9 pgs).

Japanese Official Action issued in application 2018-560852 (w/machine translation), dated Jul. 7, 2020 (4 pgs).

* cited by examiner

EXTRUDER HEAD FOR EXTRUDING CORD-REINFORCED EXTRUDATE

BACKGROUND

The invention relates to an extruder head for extruding cord reinforced extrudate.

EP 0 339 510 A2 discloses an extrusion head for producing a sheet of elastomeric material, reinforced internally with relatively close-packed metal or textile cords. The extrusion head comprises a die defined by a top die and a bottom die and a cord guide member consisting of a top plate and a bottom plate. The top and bottom parts of the die and the cord guide are mounted together on opposite sides of the cord plane by an outer casing. The extruder head defines two tapered, converging channels to supply plastic elastomeric material to the die.

When the elastomeric material is supplied to the tapered, converging channels of the extrusion head, pressure builds and pressure forces are exerted outwards onto the circumferential walls of said channels. A considerable component of said pressure forces is exerted in a direction perpendicular to the cord plane onto the parts of the extrusion head, causing the top and bottom parts of the die, the top and bottom parts of the cord guide member, and/or the outer casing to move. Consequently, the relatively positioning of said parts becomes inaccurate. Accurate positioning is particularly critical for the top and bottom parts of the die, which determine the thickness of the sheet of elastomeric material. Moreover, inaccurate positioning of the top and bottom parts of the cord guide can result in damage to said parts and/or inaccurate embedding of the cords in the elastomeric material.

It is an object of the present invention to provide an alternative extruder head for extruding cord reinforced extrudate, wherein the at least one of the aforementioned drawbacks can be reduced and/or prevented.

SUMMARY OF THE INVENTION

According to a first aspect, the invention provides an extruder head for extruding cord reinforced extrudate, wherein the extruder head comprises a die for receiving cords and extrusion material in a cord direction and a cord guide for guiding the cords side-by-side in a cord plane parallel to said cord direction into the die, wherein the extruder head further comprises a first flow channel that extends along a first flow path through the extruder head at and debouches into the die from a first side of the cord plane and a second flow channel that extends along a second flow path through the extruder head at and debouches into the die from a second side of the cord plane opposite to the first side, wherein the first flow path and the second flow path each comprise a supply section and a coat-hanger section with a widening cross section downstream of the supply section, wherein the first flow path and the second flow path, in their respective coat-hanger sections, extend under an angle within a first range of eighty-five to ninety-five degrees with respect to the cord plane along at least seventy percent of the respective coat-hanger sections.

Because of the steep, perpendicular or almost perpendicular orientation of the coat-hanger sections with respect to the cord plane, it can be prevented that a large component of the pressure forces, as a result of pressure building up in the flow channels, is directed towards and/or is generated in the die opening in a direction perpendicular to the cord plane. In particular, a considerable component of the pressure forces can be directed via the circumferential walls of the coat-hanger sections in a direction parallel or substantially parallel to the cord plane. Consequently, the extruder head is less prone to inaccuracies in the direction normal or perpendicular to the cord plane. In particular the accuracy of the thickness of the extrudate can be improved.

In an embodiment thereof, the first flow path and the second flow path, in their respective coat-hanger sections and up to the cord plane, extend under an angle within the first range with respect to the cord plane along at least seventy percent of the respective coat-hanger sections. Hence, the flow channels, up to the debouching thereof into the die, can be arranged as steep as possible with respect to the cord plane.

In a preferred embodiment the first range is eighty-eight to ninety-two degrees. Most preferably, the respective flow paths extend perpendicular to the cord plane in the respective coat-hanger sections. The steeper the angle with respect to the cord plane, the smaller the component of the pressure force that is exerted in the direction normal or perpendicular to the cord plane.

In another preferred embodiment the respective flow paths extend within the first range with respect to the cord plane along at least eighty percent, and preferably at least ninety percent of respective coat-hanger sections. Most preferably, the respective flow paths extend within the first range with respect to the cord plane in the entire respective coat-hanger sections. By ensuring that a considerable part of the respective coat-hanger sections extends within the first range, the pressure force are exerted in a direction parallel to the mating plane.

In an embodiment the coat-hanger sections debouch into the die in a direction perpendicular or substantially perpendicular to the cord plane. Hence, the flow of extrusion material can be deflected into the die directly after leaving the coat-hanger sections, e.g. by the leading end of the cord guide as described hereafter.

In an embodiment the cord guide comprises a leading end that extends at least partially into the die, wherein the leading end is provided with a first deflecting surface and a second deflecting surface extending on opposite sides of the cord plane and facing in the cord direction towards the die, wherein the coat-hanger sections of the first flow channel and the second flow channel debouch onto the first deflecting surface and the second deflecting surface, respectively, in a direction perpendicular or substantially perpendicular to the cord plane, wherein the first deflecting surface and the second deflecting surface are arranged for deflecting the extrusion material from the first flow channel and the second flow channel, respectively, towards and/or into the die. The cord guide can thus be used to deflect the flow of extrusion material in the cord direction, wherein any tolerances of the cord guide with respect to the casing can be absorbed without negatively impacting the accuracy of the extruder head in the height direction.

In an embodiment thereof the first deflecting surface and the second deflecting surface are tangent or substantially tangent to the respective coat-hanger sections and the cord plane. The flow of extrusion material can thus be deflected smoothly from the respective flow channels into the die.

In an embodiment the coat-hanger sections of the first flow channel and the second flow channel each comprise a circumferential wall, wherein the extruder head for each flow channel comprises a first coat-hanger half and a second coat-hanger half which are arranged to be placed in mutual abutment on opposite sides of a mating plane to form the circumferential wall of the respective flow channel. By forming the circumferential wall at the respective coat-hanger sections by two parts opposite to each other with respect to the mating plane, said parts can absorb the pressure forces that are being exerted onto the circumferential wall in a direction parallel or substantially parallel to the cord plane. Any tolerances between those parts in the said direction will not negatively influence the accuracy of the extruder in the height direction.

In an embodiment thereof the mating plane extends transverse or perpendicular to the cord plane and the cord direction. Hence, the coat-hanger halves can be mated along a plane that is transverse or perpendicular to the cord plane.

In a further embodiment thereof the respective flow paths extend parallel or substantially parallel to the mating plane along at least seventy percent of the respective coat-hanger sections. Consequently, the extrusion material can be made to flow through the respective coat-hanger sections in a direction parallel to mating plane, and perpendicular to the cord plane.

In an embodiment the first flow path and the second flow path intersect with and/or at least partly extend in the mating plane at the respective coat-hanger sections. Hence, the flow paths and/or the flow channels may extend close to or symmetrically along the mating plane at the respective coat-hanger sections.

In a preferred embodiment the circumferential wall of each flow channel is symmetrical or substantially symmetrical about the mating plane along at least seventy percent of the respective coat-hanger sections. Hence, the pressure forces can be distributed equally over the circumferential wall in a direction parallel to the cord plane.

In a further preferred embodiment at least seventy percent of the surface area of the circumferential wall at the respective coat-hanger sections extends within the first range with respect to the cord plane. Preferably, at least eighty percent, and most preferably at least ninety percent of the surface area of the circumferential wall at the respective coat-hanger sections extends within the first range with respect to the cord plane. The pressure forces are exerted onto the circumferential wall in a direction normal to the surface area. By having a considerable part of the surface area extending under an angle within the first range with respect to the cord plane, it can be prevented that the pressure forces are directed in a direction normal or perpendicular to the cord plane.

In a further embodiment the first coat-hanger half and the second coat-hanger half are separable in a separation direction parallel to the cord direction. Hence, the pressure forces exerted onto the coat-hanger halves can be absorbed by the separation of the coat-hanger halves in the separation direction.

In one embodiment the extruder head comprises a first head member for holding or forming the die and a second head member for holding or forming the cord guide, wherein the first coat-hanger halves are formed by the first head member and wherein the second coat-hanger halves are formed by the second head member. Hence, the extruder head can be of relatively simple design.

In an alternative embodiment the extruder head comprises a first head member for holding or forming the die and a second head member for holding or forming the cord guide, wherein the first coat-hanger halves are inserts held by the first head member and wherein the second coat-hanger halves are inserts held by the second head member. As inserts, the coat-hanger halves can be replaced by other inserts depending on the required shape of the flow channels at the respective coat-hanger sections.

In an embodiment thereof the first head member and the second head member are separable in a separation direction parallel to the cord plane. The head members can thus be separated for maintenance or replacement of the die and/or the cord guide.

In a preferred embodiment thereof the first head member and the second head member are arranged to be placed in mutual abutment on opposite sides of the mating plane. The head members can thus be mated about the same mating plane as the coat-hanger halves.

In one embodiment the extruder head comprises an escape channel extending at the mating plane, wherein the escape channel is separated from the first flow channel and the second flow channel when the first head member and the second head member are in abutment at the mating plane and wherein the escape channel is in fluid communication with the first flow channel and/or the second flow channel when the first head member and the second head member are separated in the separation direction. The escape channel can relieve some of the pressure in the extrusion material by allowing some of the extrusion material to escape from the extruder head in the event of dangerous pressure levels.

In an alternative embodiment the extruder head comprises an escape channel extending at the mating plane, wherein the escape channel is separated from the first flow channel and the second flow channel by the inserts when inserts are in abutment at the mating plane and wherein the escape channel is in fluid communication with the first flow channel and/or the second flow channel when the inserts are separated in the separation direction. The separation of the inserts can thus allow the extrusion material to escape. Hence, the inserts, rather than the head members, can be separated.

More preferably the head members are arranged to remain in mutual abutment outside of the escape channel while the inserts are separated in the separation direction. The head members can prevent that the released extrusion material and/or pressure exits the extruder head uncontrollably.

In a further embodiment the second head member comprises a first casing member at the first side of the cord plane and a second casing member at the second side of the cord plane, wherein the first casing member and the second casing member together form a receiving space for receiving the cord guide, wherein the first casing member and the second casing member are inseparable in a normal direction perpendicular to the cord plane.

In an embodiment thereof the first casing member and the second casing member form a single piece. By having a single piece, tolerances between the casing members in a direction normal or perpendicular to the cord plane can be prevented or even eliminated.

In an embodiment the die comprises a first die member at the first side of the cord plane and a second die member at the second side of the cord plane, wherein the first die member and the second die member together form a die opening through which the extrudate leaves the extruder head, wherein the first die member and the second die member are inseparable in a normal direction perpendicular to the cord plane. By having inseparable die members, tolerances between the die members in a direction normal or perpendicular to the cord plane can be prevented. Thus, the die is less prone to inaccuracies of the die opening in the height direction.

In an embodiment thereof the first die member and the second die member form a single piece. By having a single piece, tolerances between the die members in a direction normal or perpendicular to the cord plane can be prevented or even eliminated.

In an embodiment the cord guide is slidable into and out of an operational position in the extruder head in the cord direction and a sliding direction opposite to the cord direction, respectively. By sliding the cord guide in the cord direction and the sliding direction, the first casing member and the second casing member do not have to be separated.

In an embodiment thereof the extruder head further comprising a locking member that is arranged to lock the cord guide against sliding in the sliding direction when the cord guide is in the operational position. Thus, the cord guide can be securely held in place in the operational position during extrusion, so that the pressure forces generated by the extrusion material in the flow channels does not push the cord guide out of the extruder head.

In an embodiment the cord guide comprises a first guide member at the first side of the cord plane and a second guide member at the second side of the cord plane, wherein one of the first guide member and the second guide member comprises a plurality of interchangeable guide blocks which are arranged side-by-side in a lateral direction parallel to the cord plane and perpendicular to the cord direction, wherein each block comprises a plurality of guide channels extending in the cord direction at and parallel to the cord plane for receiving the cords. The guide channels in the blocks break easily because of the relatively thin walls between the guide channels. The blocks can easily be replaced when broken. It can be less costly to replace one block instead of an entire guide member.

In one embodiment thereof the extruder head further comprises a set of replacement blocks to replace one or more of the guide blocks of the cord guide, wherein at least one of the replacement blocks comprises the same plurality of guide channels as the guide blocks of the cord guide. The set can be provided together with the cord guide to ensure that the guide blocks can be replaced instantly when broken.

In an alternative embodiment thereof the extruder head further comprises a set of replacement blocks to replace one or more of the guide blocks of the cord guide, wherein at least one of the replacement blocks comprises a different number or shape of guide channels than the guide blocks of the cord guide. The replacement blocks can be used to adapt the cord guide to a different configuration of guide channels, e.g. larger guide channels, a larger or smaller number of guide channels and/or guide channels extending over a greater or smaller width of the cord guide in the lateral direction.

In a further embodiment the plurality of guide channels comprises at least one guide channel that is defined by two directly adjacent guide blocks. By providing a half guide channel at the end of a guide block instead of a relatively thin end wall, the guide block can be less prone to damage.

According to a second aspect, the invention provides a method for extruding cord reinforced extrudate with the use of the aforementioned extruder head, wherein the method comprises the steps of feeding pressurized extrusion material into the first flow channel and the second flow channel and absorbing the pressure forces generated by said pressurized extrusion material in the respective coat-hanger sections in a direction parallel or substantially parallel to the cord plane.

Again, because of the steep, perpendicular or almost perpendicular orientation of the flow channels with respect to the cord plane, it can be prevented that a large component of the pressure forces, as a result of pressure building up in the flow channels, is directed in a direction perpendicular to the cord plane.

In an embodiment of the method, the extruder head comprises an escape channel, wherein the method comprises the step of allowing the extrusion material to escape from the first flow channel and/or the second flow channel via the escape channel when the pressure level of the extrusion material rises towards a dangerous level. The escape channel can relieve some of the pressure in the extrusion material by allowing some of the extrusion material to escape from the extruder head in the event of dangerous pressure levels.

In a further embodiment, the method comprises the step of sliding the cord guide into and out of an operational position in the extruder head in the cord direction and a sliding direction opposite to the cord direction, respectively. By sliding the cord guide in the cord direction and the sliding direction, the first casing member and the second casing member do not have to be separated.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
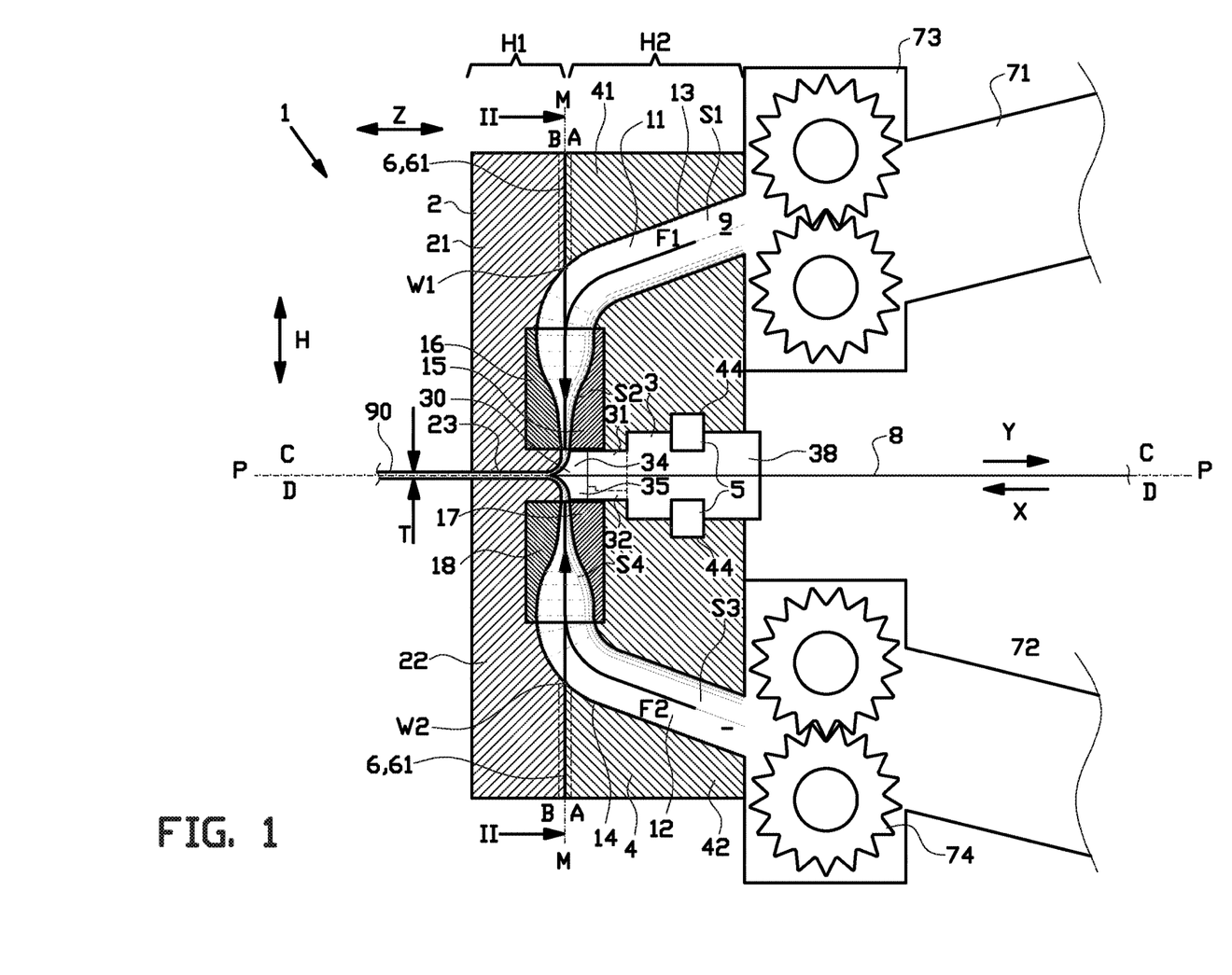
FIG. 1 shows a side view in cross section of an extruder head with a die, a cord guide and two flow channels, according to a first embodiment of the invention.
Figure 2:
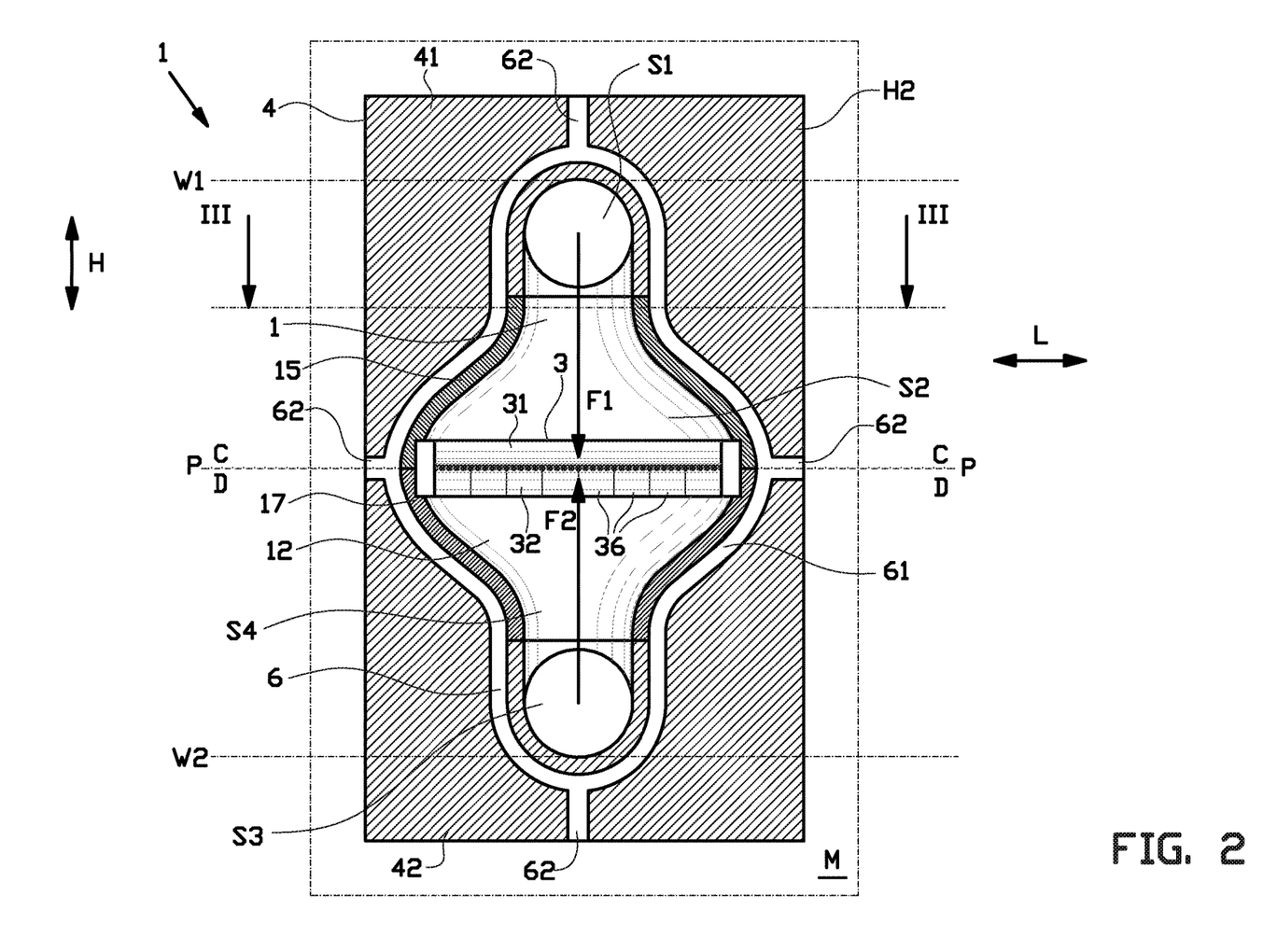
FIG. 2 shows a cross section of the extruder according to the line II-II in FIG. 1.

FIGS. 1 and 2 show an extruder head 1 for extruding cord reinforced extrudate 90, in particular cord reinforced tire components for tire building, according to an exemplary embodiment of the invention.

The extruder head 1 comprises a first head member H1 that holds or forms a die 2, a second head member H2 that forms or holds a cord guide 3 with respect to the die 2. In this exemplary embodiment, the first head member H1 forms the die 2 and the second head member H2 comprises a casing 4 for holding the cord guide 3 with respect to the die 2. The die 2 is arranged for receiving a plurality of cords 8 and extrusion material 9 in a cord direction X. The extrusion material 9 is an elastomeric material, e.g. rubber.

The cords 8 are made of a metal or a synthetic fiber. The cord guide 3 is arranged for guiding the plurality of cords 8 in a side-by-side relationship in a cord plane P into the die 2. The first head member H1 and the second head member H2 are mated or placed in mutual abutment at a mating plane M that extends transverse or perpendicular to the cord direction X and the cord plane P. The cord guide 3 and the casing 4 are located at a first side A of the mating plane M while the die 2 is located at a second side B of the mating plane M opposite to the first side A.

The extruder head 1 further comprises a first flow channel 11 and a second flow channel 12 extending through the second head member H2 at the first side A of the mating plane M and at least partly in the second head member H2 at the second side B of the mating plane M. The first flow channel 11 and the second flow channel 12 are arranged to be placed in fluid communication with a first extruder 71 and a second extruder 72, respectively. Preferably, a first gear pump 73 is provided between the first extruder 71 and the first flow channel 11 and a second gear pump 74 is provided between the second extruder 72 and the second flow channel 12 to provide a pressurized and/or uniform flow of extrusion material into the respective flow channels 11, 12.

As shown in FIG. 1, the die 2 comprises a first die member 21 that is arranged on a first side C of the cord plane P and a second die member 22 that is arranged on a second side D of the cord plane P, opposite to the first die member 21 at the first side C. The first die member 21 and the second die member 22 form a die opening 23 for shaping the extrusion material 9 in the desired shape of the extrudate 90. The die opening 23 has a height in a height direction H that defines the thickness T of the extrudate 90. In this exemplary embodiment, the first die member 21 and the second die member 22 are inseparable, integral, monolithic or form a single piece. Preferably, the die 2 is made from a rigid material such as metal. Hence, the first die member 21 and the second die member 22 are substantially tolerance free in the height direction H of the die opening 23.

As shown in FIG. 1, the first flow channel 11 extends through the first casing member 41 of the second head member H2 and debouches into the die opening 23 from the first side C of the cord plane P. The second flow channel 12 extends through the second casing member 42 of the second head member H2 and debouches into the die opening 23 from the second side D of the cord plane P. The first flow channel 11 is formed by a first circumferential wall 13 that defines or extends along a first flow path F1 for the extrusion material 9 through the second head member H2 and into the die opening 23. The second flow channel 12 is formed by a second circumferential wall 14 that defines a second flow path F2 for the extrusion material 9 through the second head member H2 and into the die opening 23. Both circumferential walls 13, 14 extend coaxially to the respective flow paths F1, F2. In other words, the flow paths F1, F2 extend through the heart and/or the center of the circumferential walls 13, 14.

As shown in FIGS. 1 and 2, the first flow channel 11 and the second flow channel 12 each comprises a supply section S1, S3 for receiving the extrusion material from the respective extruders 71, 72 and a so-called 'coat-hanger' section S2, S4 downstream of the respective supply sections S1, S3 for distributing the extrusion material 9 from the supply sections S1, S3 towards the die opening 23. The supply sections S1, S3 are circular or substantially circular in cross section. The cross sections of the supply sections S1, S3 are relatively constant through the extruder head 1. As best seen in FIG. 2, the coat-hanger sections S2, S4 diverge or widen in a lateral direction L parallel to the cord plane P and perpendicular to the cord direction X from or with respect to the relatively constant, cross section of the supply sections S1, S3 into a relatively flat and wide cross section that substantially corresponds to or merges into the die opening 23. Optionally, the flow channel 11, 12 is provided with edges, flow dividers or other features (not shown) for optimizing the flow and/or the distribution of the extrusion material 9 in the coat-hanger sections S2, S4. The widening cross section of the coat-hanger sections S2, S4 gives these sections their characteristic shape, resembling the shape of a coat-hanger.

The supply section S1 of the first flow channel extends at an oblique angle with respect to the cord plane P through the first casing member 41 at the first side A of the mating plane M from the first extruder 71 and/or the first gear pump 73 towards the first die member 21. The supply section S1 intersects with the mating plane M from the first side A to the second side B at a first intersection W1. At or near the first intersection W1, the supply section S1 deflects steeply towards the cord plane P. The coat-hanger section S2 of the first flow channel 11 starts at the widening of the first circumferential wall 13 in the lateral direction L, as shown in FIG. 2 and continues downstream of the supply section S1 until the debouching of the first flow channel 11 into the die opening 23.

In said coat-hanger section S2, the first flow path F1 extends within a first range of eighty-five to ninety-five degrees with respect to the cord plane P along at least seventy percent, preferably at least eighty percent and most preferably at least ninety percent of the coat-hanger section S2. Preferably, as in this exemplary embodiment, the first range is eighty-eight to ninety-two degrees. More in particular, at least seventy percent, preferably at least eighty percent and most preferably at least ninety percent of the surface area of the first circumferential wall 13 at said coat-hanger section S2 extends within the first range with respect to the cord plane P.

As a result, a considerable part of the first flow channel 11 and/or the first flow path F1 extends parallel or substantially parallel, e.g. within a deviation of five degrees or less, to the mating plane M.

As shown in FIG. 1, the second flow channel 12 is mirror-symmetrical to the first flow channel 11 with respect to the cord plane P. As such, the second flow channel 12 comprises a corresponding supply section S3 that extends at an oblique angle with respect to the cord plane P through the second casing member 42 of the second head member H2 at the first side A of the mating plane M from the second extruder 72 and/or the second gear pump 74 towards the die 2. The second flow channel 12 intersects with the mating plane M from the first side A to the second side B at a second intersection W2. The supply section S3 of the second flow channel 12 deflects steeply towards the cord plane P. The second flow channel 12 further comprises a coat-hanger section S4 that starts at the widening of the second circumferential wall 14 in the lateral direction L, as shown in FIG. 2, and continues downstream of the supply section S3 until the debouching of the second flow channel 12 into the die opening 23.

The supply section S3 and the coat-hanger section S4 of the second flow channel 12 extend mirror-symmetrically at the second side D of the cord plane P to the supply section S1 and the coat-hanger section S2, respectively, of the first flow channel 11 at the first side C of the cord plane P and thus meet the same first range, surface area and other conditions as previously discussed for the supply section S1 and the coat-hanger section S2. As a result, a considerable part of the coat-hanger section S4 of the second flow channel 12 also extends parallel or substantially parallel, e.g. within a deviation of five degrees or less, to the mating plane M.

Because of the steep, perpendicular or almost perpendicular orientation of the coat-hanger sections S2, S4 of both first flow channel 11 and the second flow channel 12 with respect to the cord plane C, a large component of the pressure forces, as a result of pressure building up in the extrusion material 9 in the first flow channel 11 and the second flow channel 12, can be directed in a direction perpendicular or substantially perpendicular to the mating plane M and/or parallel or substantially parallel to the cord plane P. Consequently, forces perpendicular to the cord plane P can be reduced and/or prevented, thereby rendering the extruder head 1 less prone to inaccuracies in the height direction H. In particular the accuracy of the thickness T of the extrudate 90 can be improved.

Figure 3:
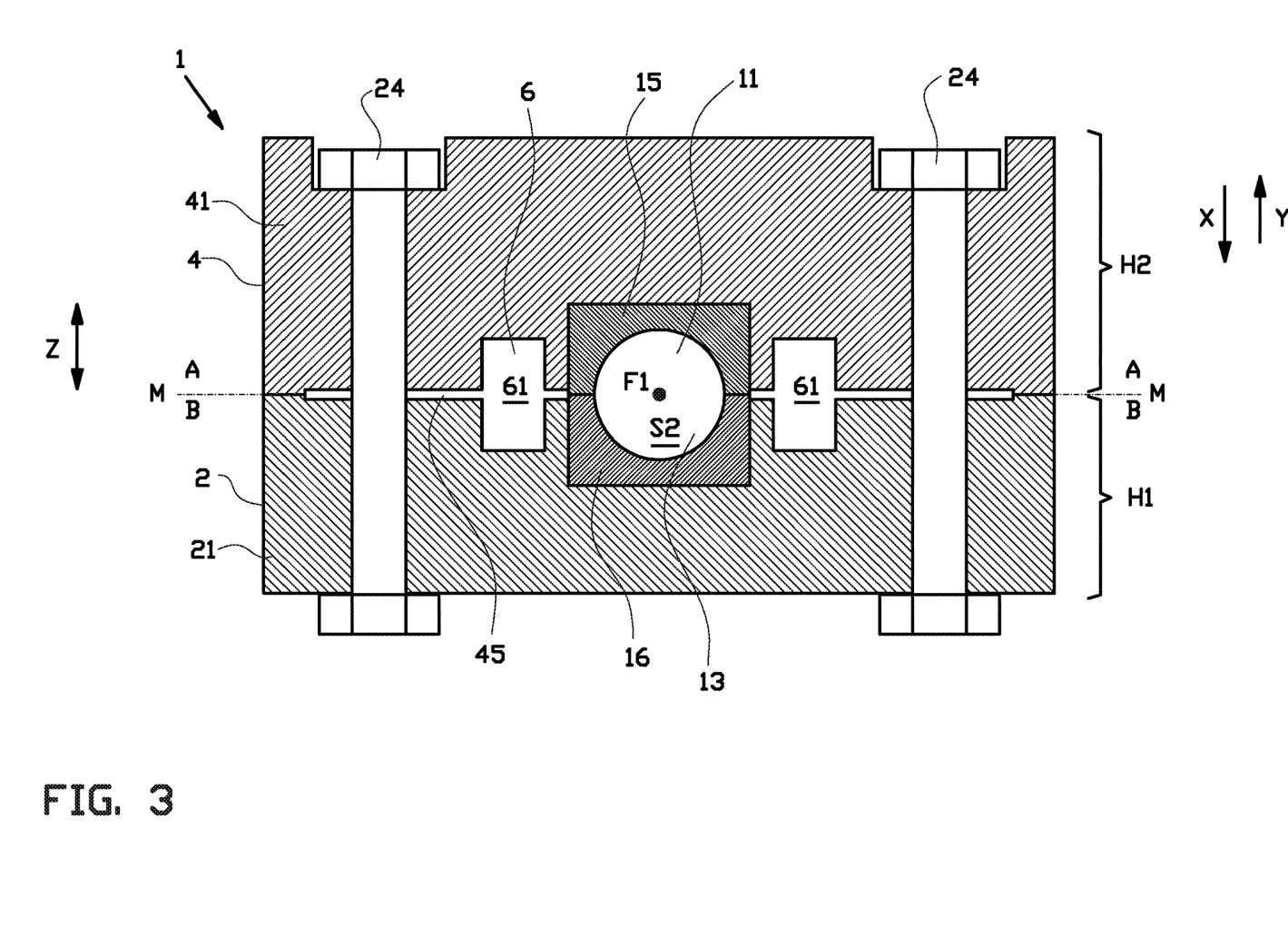
FIG. 3 shows a cross section of the extruder according to the line in FIG. 2.

In this exemplary embodiment, as shown in FIG. 1, the extruder head 1 comprises a plurality of interchangeable inserts 15-18 that form the circumferential walls 13, 14 of the respective flow channels 11, 12, at least at or along the coat-hanger sections S2, S4. Said inserts 15-18 are held in place by the head members H1, H2. The inserts 15-18 are replaceable by other inserts depending on the required shape of the flow channels 11, 12. FIGS. 1 and 3 show that the first flow channel 11 is formed by an first insert formed as a first coat-hanger half 15 on the first side A of the mating plane M and a second insert formed as a second coat-hanger half 16 on the second side B of the mating plane M. Similarly, as shown in FIG. 1, the second circumferential wall 14 at the coat-hanger section S4 of the second flow channel 12 is formed by a third insert in the form of a first coat-hanger half 17 on the first side A of the mating plane M and a fourth insert in the form of a second coat-hanger half 18 on the second side B of the mating plane M. As shown in FIG. 3, the head members H1, H2 are securely clamped together with clamping members 24 about the mating plane M in the outer area around the escape channel 6 with the coat-hanger halves 15-18 mated about the same mating plane M in between.

As shown in FIG. 1, the first head member H1 and the second head member H2 are mated about the mating plane M. For maintenance or replacement of die 2, the cord guide 3 and/or the coat-hanger halves 15-18, the first head member H1 and the second head member H2 can be moved apart in a separation direction Z perpendicular to the mating plane M. As shown in FIGS. 1 and 2, the extruder head 1 is further provided with an escape channel 6 extending at or in the mating plane M in between the first head member H1 and the second head member H2. The escape channel 6 is preferably formed in the die 2, the casing 4 or both. As best seen in FIG. 2, the escape channel 6 extends around the die opening 23, the first flow channel 11 and the second flow channel 12 in the mating plane M and is fluidically separated from said die opening 23 and said flow channels 11, 12 by the mutual abutment of the first head member H1 and the second head member H2 at the mating plane M. In particular, the escape channel 6 comprises a ring-like main channel 61 extending circumferentially around a group of features including the first flow channel 11, the second flow channel 12 and the die opening 23, and a plurality of discharge channels 62 branching off from the main channel 61 to the outside of the extruder head 1.

At the coat-hanger halves 15-18, the head members H1, H2 are provided with a negative tolerance, i.e. a gap 45, to ensure that the coat-hanger halves 15-18 are clamped together securely. Preferably, the gap 45 extends from the coat-hanger halves 15-18 to the escape channel 6. When the pressure of the extrusion material 9 in the die opening 23, first flow channel 11 and/or the second flow channel 12 rises towards dangerous levels, e.g. a level that would cause the extruder head 1 to explode, the coat-hanger halves 15-18 are allowed to move apart slightly in the separation direction Z, while the parts of the head members H1, H2 outside of the escape channel 6 are still in mutual abutment about the mating plane M. The spacing allows the high pressure extrusion material 9 to escape into the escape channel 6 and out of the extruder head 1. This should relieve the pressure in the extrusion material 9 to acceptable levels.

Figure 5A:
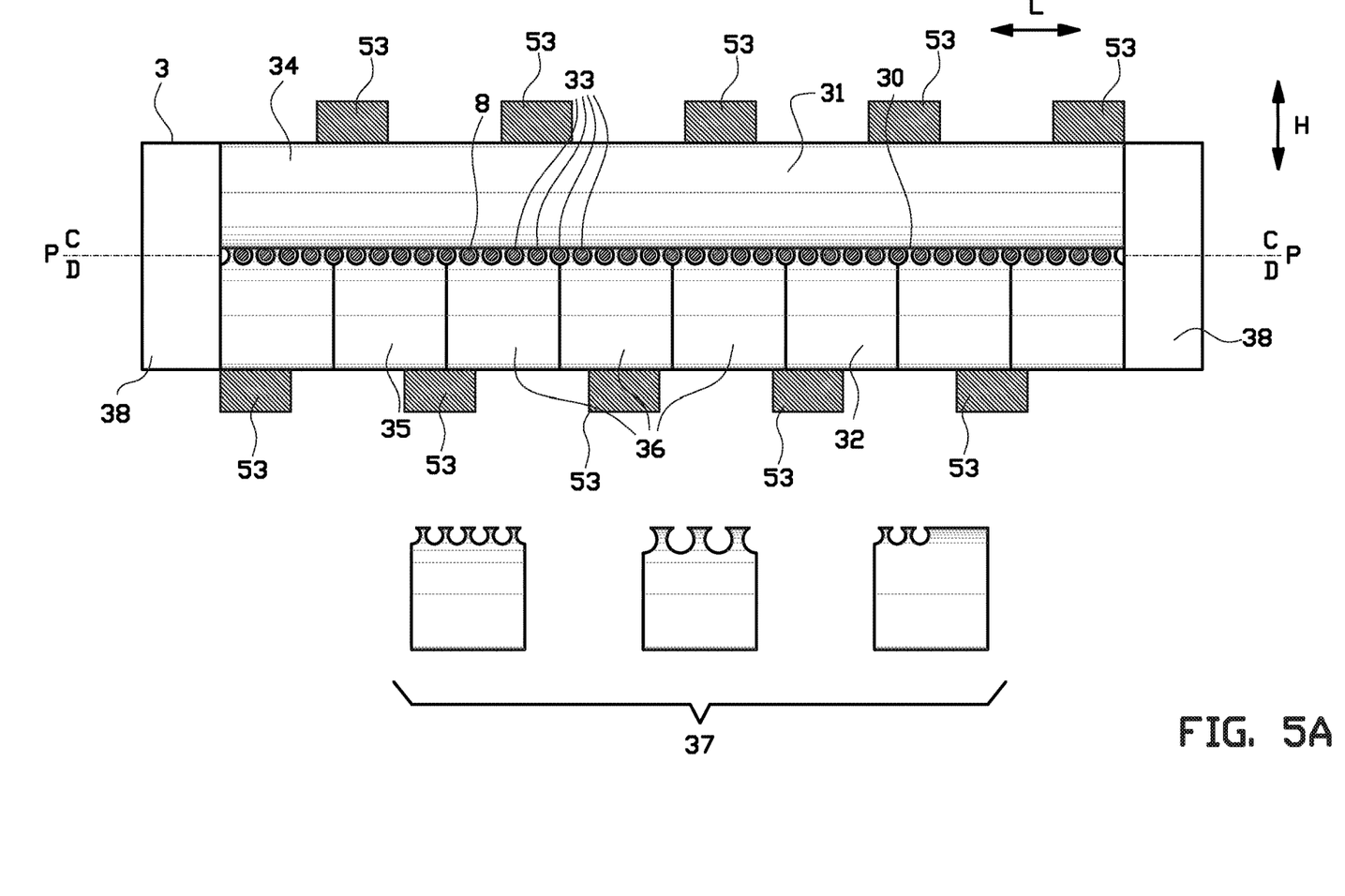
FIG. 5A shows a front view of the cord guide of FIG. 4 in more detail.
Figure 5B:
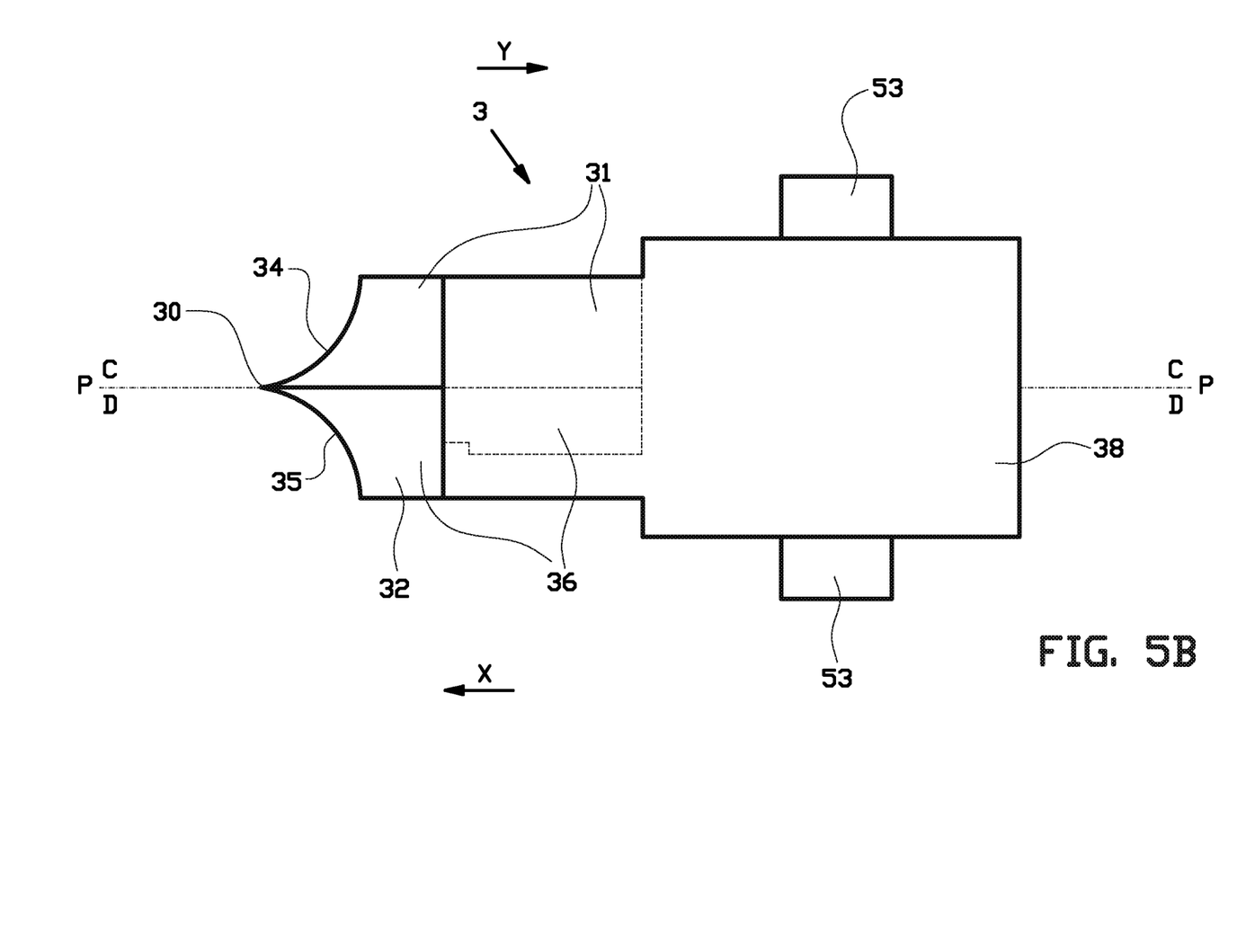
FIG. 5B shows a side view of the cord guide of figure 5A.

As shown in FIGS. 5A and 5B, the cord guide 3 comprises a first guide member 31 on the first side C of the cord plane P, a second guide member 32 substantially on the second side B of the cord plane P and a holder 38 for holding the first guide member 31 and the second guide member 32 together on said opposite sides C, D of the cord plane P. One of the first guide member 31 and the second guide member 32 or both form a plurality of mutually parallel guide channels 33 extending side-by-side in the cord plane P, parallel or substantially parallel to the cord direction X. Each guide channel 33 is arranged for individually receiving a cord 8. Preferably, the guide channels 33 are formed in or are at least partly located in the second guide member 32. The guide channels 33 are closed by abutment of the second guide member 32 with the first guide member 31. The cord guide 3 is provided with a leading end 30 facing towards the die 2 in the cord direction X. At said leading end 30, the first guide member 31 comprises a first deflecting surface 34 extending at the first side C of the cord plane P for deflecting the flow of extrusion material from the coat-hanger sections S2 of the first flow channel 11 towards and/or into the die opening 23. At the same leading end 30, the second guide member 32 comprises a second deflecting surface 35 extending at the second side D of the cord plane P for deflecting the flow of extrusion material from the coat-hanger sections S4 of the second flow channel 12 towards and/or into the die opening 23.

In this particular embodiment, as shown in FIGS. 5A and 5B, the second guide member 32 comprises a plurality of guide blocks 36 which are arranged side-by-side in a lateral direction L in the holder 38, parallel to the cord plane P and perpendicular to the cord direction X. Each guide block 36 comprises a number of the guide channels 33. At the sides of the guide blocks 36 in the lateral direction L, each guide block 36 is provided with a half guide channel 33 that forms a complete guide channel with a half guide channel 33 of a directly adjacent guide block 36.

The guide channels 33 are easily damaged because of the thin walls between them. The extruder head 1 comes with a set of replacement blocks 37 to replace one or more guide blocks 36 when damaged or to change the configuration of the guide channels 33. The guide blocks 36 can be interchanged easily for one or more of the replacement blocks 37. The replacement blocks 37 may comprise alternatively shaped guide channels. When the die width is reduced, the replacement blocks 37 at the opposite ends of the plurality of guide blocks 36 may have less guide channels 33.

Figure 6:
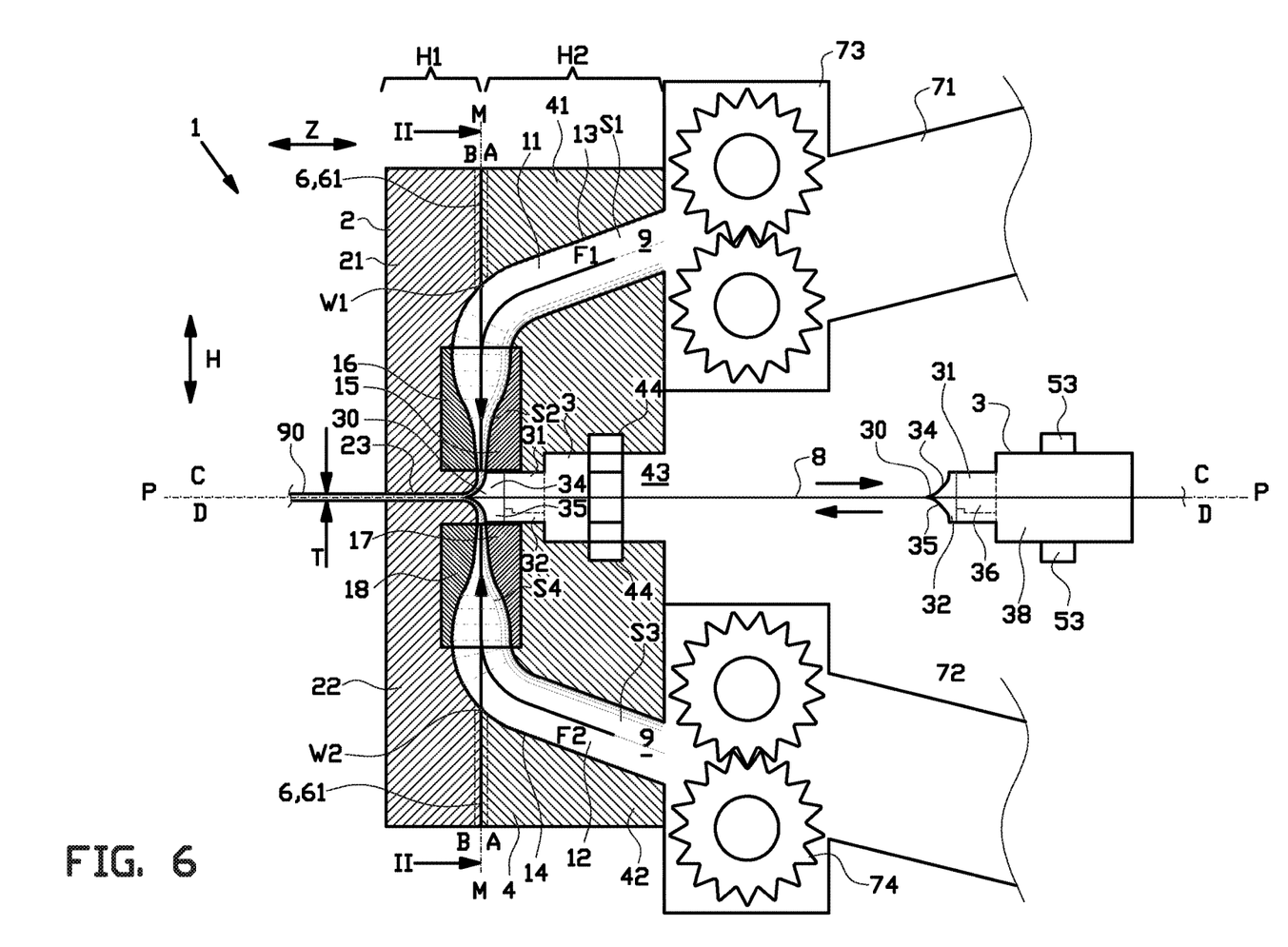
FIG. 6 shows a side view in cross section of the extruder head of FIG. 1, with the cord guide slid into an inoperative position.

As shown in FIG. 1, the casing 4 comprises a first casing member 41 on the first side C of the cord plane P and a second casing member 42 on the second side D of the cord plane P. As best seen in FIG. 6, the first casing member 41 and the second casing member 42 form a receiving space 43 for receiving the cord guide 3. The casing 4 is arranged for holding and positioning the cord guide 3 with respect to the cord plane P and the die 2. In this exemplary embodiment, the first casing member 41 and the second casing member 42 are inseparable, integral, monolithic or form a single piece. Preferably, the casing 4 is made from a rigid material such as metal. Hence, the first casing member 41 and the second casing member 42 are substantially tolerance free in the height direction H of the receiving space 43.

The cord guide 3 is slidably insertable into the receiving space 43 of the casing 4 in the cord direction X, parallel to the cord plane P, into an operative position as shown in FIG. 1. The cord guide 3 is slidably removable from the casing 4 in a sliding direction Y opposite to the cord direction X into an inoperative position as shown in FIG. 6. The cord guide 3 is preferably supported on a carriage (not shown) to keep the cord guide 3 level with the cord plane P. Hence, the cord guide 3 can be slid in the sliding direction Y over the plurality of cords 8, without removing said cords 8 from the cord guide 3. The cord guide 3 can be spaced apart from the extruder head 1 and the extruders 71, 72 in the inoperative position to allow the first guide member 31 to be lifted from the second guide member 32 and out of the holding member 38. Subsequently, new cords 8 can be inserted into the guide channels 33 of the cord guide 3.

Figure 4A:
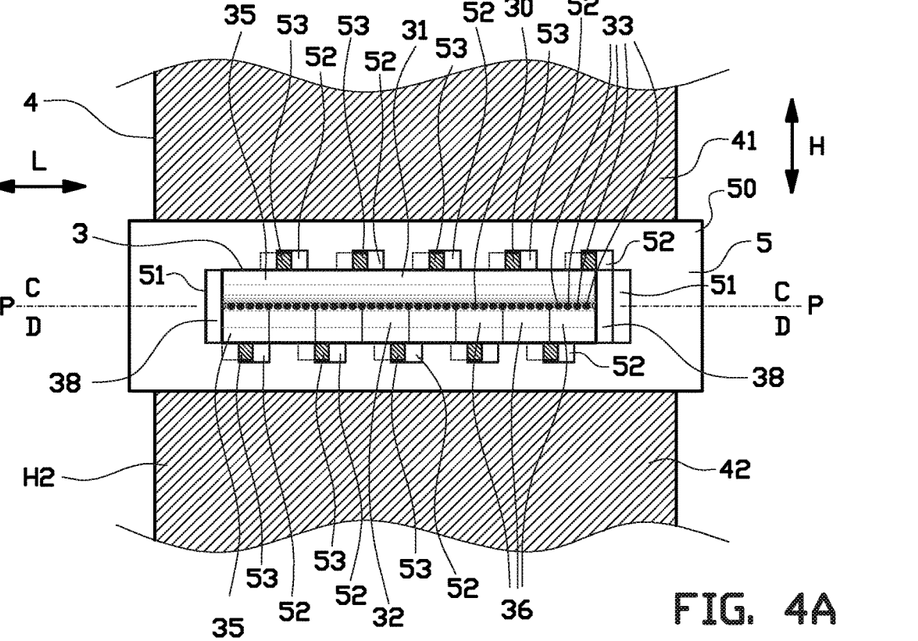
FIGS. 4A and 4B show the extruder according to FIG. 1, wherein the cord guide is locked and unlocked, respectively, against sliding with respect to the extruder head.
Figure 4B:
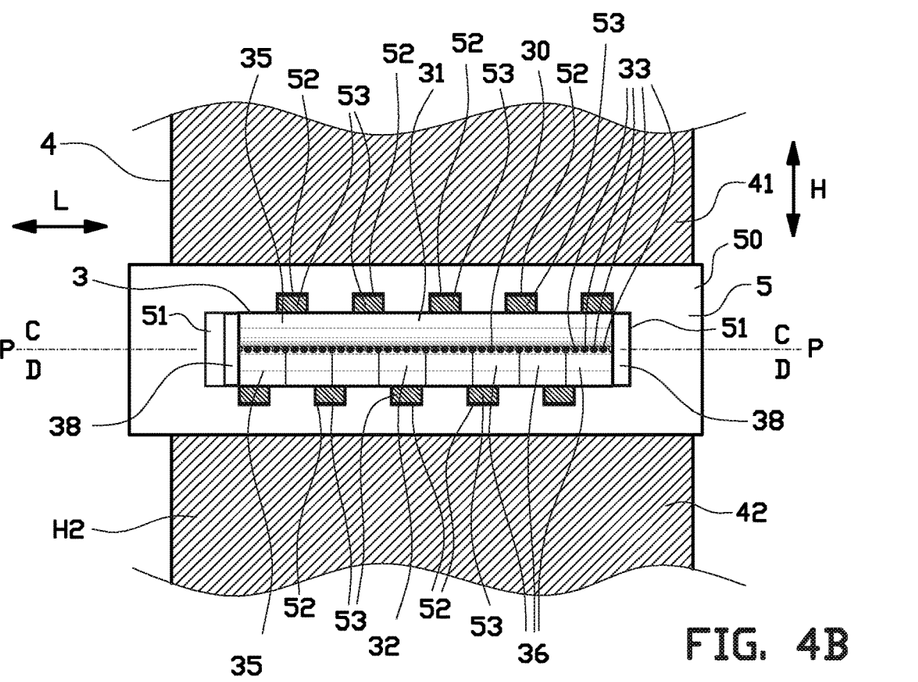

To lock the cord guide 3 in the operative position against sliding in the sliding direction Y, the extruder head 1 is provided with a locking member 5. The locking member 5 is received in a slot 44 in the casing 4 and is slidable with respect to said casing 4 in the lateral direction L between a locking position, as shown in FIG. 4A and a release position as shown in FIG. 4B. The locking member 5 comprises a locking plate 50 with a main opening 51 and a plurality of recesses 52. In the locking position, the recesses 52 are misaligned with the protrusions 53 of the cord guide 3 in the sliding direction Y. Hence, the cord guide 3 is retained with respect to the casing 4 in the sliding direction Y. In the release position, the recesses 52 are aligned with the protrusions of the cord guide 3 such that the cord guide 3 is removable from the casing 4 in the sliding direction Y.

The individual aspects of the cord guide 3, in particular of the interchangeable guide blocks 36, the slidability in the sliding direction Y and/or the locking member 5, are independent from the aspects described hereafter in relation to the flow channels 11, 12 and can be made subject of divisional patent applications.

As shown in FIG. 1, the first deflecting surface 34 and the second deflecting surface 35 at the leading end 30 of the cord guide 3 are tangent or substantially tangent to the circumferential walls 13, 14 of the first flow channel 11 and the second flow channel 12, respectively, at the respective coat-hanger sections S2, S4 to smoothly receiving the flow of extrusion material from the respective flow paths F1, F2. The deflecting surfaces 34, 35 are concave in the cord direction X. Preferably, the deflecting surfaces 34, 35 are tangent to the cord plane P on the opposite sides C, D of said cord plane P. The deflecting surfaces 34, 35 are thus arranged for smoothly receiving and deflecting the flow of extrusion material 9 from the respective flow paths F1, F2 into the cord direction X.

Alternatively, the deflecting surfaces 34, 35 can be substantially planar (not shown) and arranged at an angle in a second range of thirty to fifty degrees, and preferably approximately forty-five degrees, with respect to the cord plane P. In both cases, the first flow channel 11 and the second flow channel 12 debouch onto the first deflecting surface 34 and the second deflecting surface 35, respectively, in a direction perpendicular or substantially perpendicular to the cord plane P and/or in a direction parallel or substantially parallel to the mating plane M. At said deflecting surfaces 34, 35, the extrusion material 9 will exert a pressure force onto the cord guide 3, with at least a component of said pressure force acting in the sliding direction Y opposite to the cord direction X. The cord guide 3 is locked by the locking member 5 in the operational position as shown in FIG. 1. However, any tolerances between the cord guide 3 and the casing 4 in said sliding direction Y do not negatively influence the accuracy of the extruder head 1 in the height direction H.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

Figure 7:
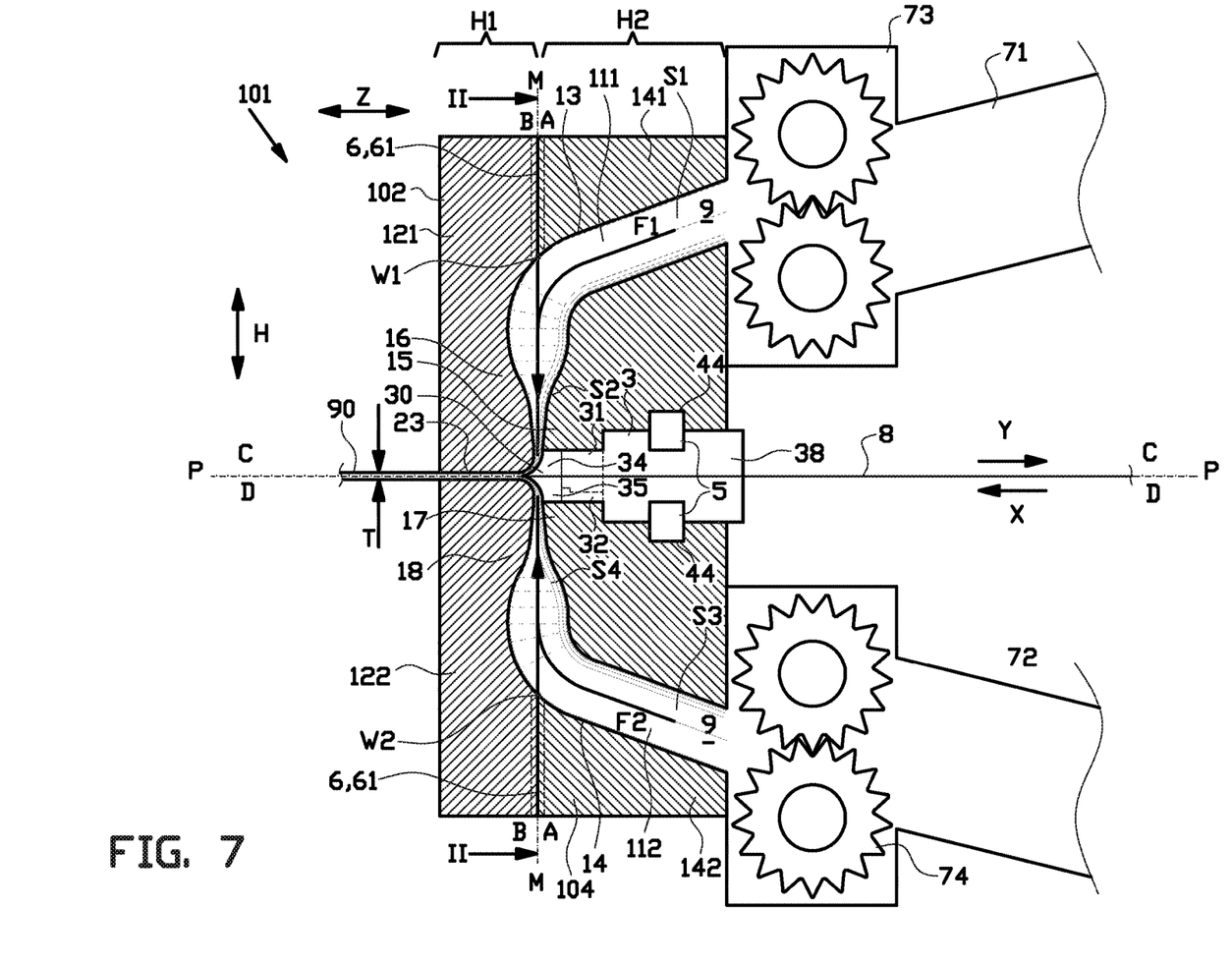
FIG. 7 shows a side view in cross section of an alternative extruder head with a die, a cord guide and two flow channels, according to a second embodiment of the invention.

For example, FIG. 7 shows an alternative extruder head 101 which differs from the previously discussed extruder head 1 in that its flow channels 111, 112 are formed by the head members H1, H2 rather than the inserts 15-18 of FIG. 1. In particular, the first flow channel 111 is formed by the first die member 121 of the die 102 and the first casing member 141 of the casing 104 and the second flow channel 112 is formed by the second die member 122 of the die 102 and the second casing member 142 of the casing 104. Although this alternative embodiment is slightly less flexible without the inserts 15-18, one skilled in the art will appreciate that the flow channels 111, 112 are still divided into a supply sections S1, S3 with a relatively constant, circular cross section and widening coat-hanger sections S2, S4, similar to the sections S1-S4 in FIGS. 1, 2 and 3. The coat-hanger sections S2, S4 still meet the previously discussed first range. Instead of the inserts 15-18 separating in the separation direction Z, the head members H1, H2 are separable when the pressure exceeds a threshold value, to relieve the pressure in the extrusion material 9.

Moreover, many variations in shapes and designs of the flow channels will be apparent to one skilled in the art and are encompassed by the scope of the present invention when they meet the ranges as specified in the claims.

In summary, the invention relates to an extruder head 1, 101 for extruding cord reinforced extrudate, wherein the extruder head 1, 101 comprises a die 2, 102 and a cord guide 3, wherein the extruder head 1, 101 further comprises a first flow channel 11, 111 that extends along a first flow path F1 through the extruder head 1, 101 at and debouches into the die 2, 102 from a first side C of a cord plane P and a second flow channel 12, 112 that extends along a second flow path F2 through the extruder head 1, 101 at and debouches into the die 2, 102 from a second side D of the cord plane P, wherein the first flow path F1 and the second flow path F2 each comprise a supply section S1, S3 and a coat-hanger section S2, S4, wherein the first flow path F1, and the second flow path F2, in their respective coat-hanger sections S2, S4, extend within a first range of eighty-five to ninety-five degrees with respect to the cord plane P along at least seventy percent of the coat-hanger sections S2, S4.

The invention claimed is:

1. An extruder head for extruding cord reinforced extrudate, wherein the extruder head comprises a die for receiving cords and extrusion material in a cord direction and a cord guide for guiding the cords side-by-side in a cord plane parallel to said cord direction into the die, wherein the extruder head further comprises a first flow channel that extends along a first flow path through the extruder head at and debouches into the die from a first side of the cord plane and a second flow channel that extends along a second flow path through the extruder head at and debouches into the die from a second side of the cord plane opposite to the first side, wherein the first flow path and the second flow path each comprise a supply section and a coat-hanger section with a widening cross section downstream of the supply section, wherein the first flow path and the second flow path, in their respective coat-hanger sections, extend under an angle within a first range of eighty-five to ninety-five degrees with respect to the cord plane along at least seventy percent of the respective coat-hanger sections.

2. The extruder head according to claim 1, wherein the first flow path and the second flow path, in their respective coat-hanger sections and up to the cord plane, extend under an angle within the first range with respect to the cord plane along at least seventy percent of the respective coat-hanger sections.

3. The extruder head according to claim 1, wherein the first range is eighty-eight to ninety-two degrees.

4. The extruder head according to claim 1, wherein the the first flow path and the second flow path extend perpendicular to the cord plane in the respective coat-hanger sections.

5. The extruder head according to claim 1, wherein the first flow path and the second flow path extend within the first range with respect to the cord plane along at least eighty percent or at least ninety percent of respective coat-hanger sections.

6. The extruder head according to claim 1, wherein the first flow path and the second flow path extend within the first range with respect to the cord plane in the entire respective coat-hanger sections.

7. The extruder head according to claim 1, wherein the coat-hanger sections debouch into the die in a direction perpendicular to the cord plane.

8. The extruder head according to claim 1, wherein the cord guide comprises a leading end that extends at least partially into the die, wherein the leading end is provided with a first deflecting surface and a second deflecting surface extending on the first side and the second side of the cord plane, respectively, and facing in the cord direction towards the die, wherein the coat-hanger sections of the first flow channel and the second flow channel debouch onto the first deflecting surface and the second deflecting surface, respectively, in a direction perpendicular to the cord plane, wherein the first deflecting surface and the second deflecting surface are arranged for deflecting the extrusion material from the first flow channel and the second flow channel, respectively, towards and/or into the die.

9. The extruder head according to claim 8, wherein the first deflecting surface and the second deflecting surface are tangent to the respective coat-hanger sections and the cord plane.

10. The extruder head according to claim 1, wherein the extruder comprises a mating plane that extends transverse or perpendicular to the cord direction and the cord plane, wherein the coat-hanger sections of the first flow channel and the second flow channel each comprise a circumferential wall, wherein the extruder head for each flow channel comprises a first coat-hanger half and a second coat-hanger half which are arranged to be placed in mutual abutment on opposite sides of the mating plane to form the circumferential wall of the respective flow channel.

11. The extruder head according to claim 10, wherein the mating plane extends transverse or perpendicular to the cord plane and the cord direction.

12. The extruder head according to claim 10, wherein the first flow path and the second flow path extend parallel to the mating plane along at least seventy percent of the respective coat-hanger sections.

13. The extruder head according to claim 10, wherein the first flow path and the second flow path intersect with and/or at least partly extend in the mating plane at the respective coat-hanger sections.

14. The extruder head according to claim 10, wherein the circumferential wall of each flow channel is symmetrical about the mating plane along at least seventy percent of the respective coat-hanger sections.

15. The extruder head according to claim 10, wherein at least seventy percent of the surface area of the circumferential wall at the respective coat-hanger sections extends within the first range with respect to the cord plane.

16. The extruder head according to claim 10, wherein the first coat-hanger half and the second coat-hanger half are separable in a separation direction parallel to the cord direction.

17. The extruder head according to claim 10, wherein the extruder head comprises a first head member for holding or forming the die and a second head member for holding or forming the cord guide, wherein the first coat-hanger halves are formed by the first head member and wherein the second coat-hanger halves are formed by the second head member.

18. The extruder head according to claim 10, wherein the extruder head comprises a first head member for holding or forming the die and a second head member for holding or forming the cord guide, wherein the first coat-hanger halves are inserts held by the first head member and wherein the second coat-hanger halves are inserts held by the second head member.

19. The extruder head according to claim 18, wherein the first head member and the second head member are separable in a separation direction parallel to the cord plane.

20. The extruder head according to claim 18, wherein the first head member and the second head member are arranged to be placed in mutual abutment on opposite sides of the mating plane.

21. The extruder head according to claim 17, wherein the first coat-hanger half and the second coat-hanger half are separable in a separation direction parallel to the cord direction, wherein the extruder head comprises an escape channel extending at the mating plane, wherein the escape channel is separated from the first flow channel and the second flow channel when the first head member and the second head member are in abutment at the mating plane and wherein the escape channel is in fluid communication with the first flow channel and/or the second flow channel when the first head member and the second head member are separated in the separation direction.

22. The extruder head according to claim 18, wherein the extruder head comprises an escape channel extending at the mating plane, wherein the escape channel is separated from the first flow channel and the second flow channel by the inserts when inserts are in abutment at the mating plane and wherein the escape channel is in fluid communication with the first flow channel or the second flow channel when the inserts are separated in the separation direction.

23. The extruder head according to claim 22, wherein the head members are arranged to remain in mutual abutment outside of the escape channel while the inserts are separated in the separation direction.

24. The extruder head according to claim 17, wherein the second head member comprises a first casing member at the first side of the cord plane and a second casing member at the second side of the cord plane, wherein the first casing member and the second casing member together form a receiving space for receiving the cord guide, wherein the first casing member and the second casing member are inseparable in a normal direction perpendicular to the cord plane.

25. The extruder head according to claim 1, wherein the die comprises a first die member at the first side of the cord plane and a second die member at the second side of the cord plane, wherein the first die member and the second die member together form a die opening through which the extrudate leaves the extruder head, wherein the first die member and the second die member are inseparable in a normal direction perpendicular to the cord plane.

26. The extruder head according to claim 1, wherein the cord guide is slidable into and out of an operational position in the extruder head in the cord direction and a sliding direction opposite to the cord direction, respectively.

27. The extruder head according to claim 26, wherein the extruder head further comprising a locking member that is arranged to lock the cord guide against sliding in the sliding direction when the cord guide is in the operational position.

28. The extruder head according to claim 1, wherein the cord guide comprises a first guide member at the first side of the cord plane and a second guide member at the second side of the cord plane, wherein one of the first guide member and the second guide member comprises a plurality of interchangeable guide blocks which are arranged side-by-side in a lateral direction parallel to the cord plane and perpendicular to the cord direction, wherein each block comprises a plurality of guide channels extending in the cord direction at and parallel to the cord plane for receiving the cords.

29. The extruder head according to claim 28, wherein the interchangeable guide blocks comprises the same plurality of guide channels as the guide blocks of the cord guide.

30. The extruder head according to claim 28, wherein the interchangeable guide blocks comprises a different number or shape of guide channels than the guide blocks of the cord guide.

31. The extruder head according to claim 28, wherein the plurality of guide channels comprises at least one guide channel that is defined by two directly adjacent guide blocks.

32. A method for extruding cord reinforced extrudate with the use of the extruder head according to claim 1, wherein the method comprises the steps of feeding pressurized extrusion material into the first flow channel and the second flow channel and absorbing the pressure forces generated by said pressurized extrusion material in the respective coathanger sections in a direction parallel to the cord plane.

\* \* \* \* \*